Figure 1:
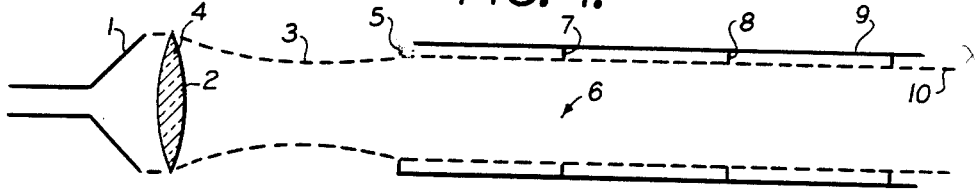

Aug. 17, 1965

G. J. E. GOUBAU 3,200,697

IRIS TYPE BEAM WAVE GUIDE

Filed April 11, 1961

INVENTOR
GEORG JOHANN ERNST GOUBAU
BY
ATTORNEY.

United States Patent Office 3,200,697
Patented Aug. 17, 1965

3,200,697
IRIS TYPE BEAM WAVE GUIDE
Georg Johann Ernst Goubau, Eatontown, N.J., assignor to Beam Guidance, Inc., New York, N.Y., a corporation of New York
Filed Apr. 11, 1961, Ser. No. 114,581
11 Claims. (Cl. 88—1)

This invention may be manufactured and used by or for the Government for governmental purposes without the payment to me of any royalty thereon.

This invention relates to the guiding of electromagnetic wave beams, especially of the submillimeter and optical range.

It is a continuation-in-part of U.S. Ser. No. 775,402 filed November 21, 1958, now Patent No. 3,101,472.

One of the objects of the invention is to provide a beam wave guide in which a beam of free waves, having at one point of its path a predetermined aperture and cross-section phase and amplitude distribution at said aperture, is diffracted at a succeeding point in such a way that the phase distribution prevailing at a further succeeding point substantially amounts to that prevailing at the first point.

Another object of the invention is to derive, from a more or less ordinary or incoherent light source, a light beam of predetermined aperture and cross-section amplitude and phase distribution at that point and to repeatedly diffract at a series of subsequent points the light beam in such a way as to produce an iterative light beam having substantially the same aperture and phase distribution over its entire length.

Still another object of the invention is to provide a coherent light source producing a free wave beam of predetermined aperture and cross-section amplitude and phase distribution and repeatedly diffract such light beam at a number of subsequent points of its passage to produce at a number of cross-sections following said subsequent point substantially the same phase distribution as existing at the first point.

Still further an object of the invention is to derive from a coherent light source a free light beam of predetermined aperture and cross-sectional amplitude and phase distribution and to image said light beam onto another aperture of different diameter and repeatedly to diffract the light beam derived from said other aperture at succeeding locations in such a manner that the phase distributions produced at locations following said succeeding locations are substantially equal to the phase distribution existing at the other aperture.

A more specific object of the invention is to provide a beam of free waves of predetermined cross-section amplitude and phase distribution at a predetermined point along its path having a predetermined aperture and repeatedly correcting the phase distribution at successive points along that path by iterative diffraction to reset the phase distribution at points following that succeeding point to substantially the same distribution existing at the outset whereby the ratio between the square of the aperture radius and the product of the distance between such succeeding points and the wave length is of the order of magnitude of 10.

As an additional object of the invention such ratio may be made smaller than 10 by combining diffracting means at at least some of said subsequent points with refracting means.

Figure 2:
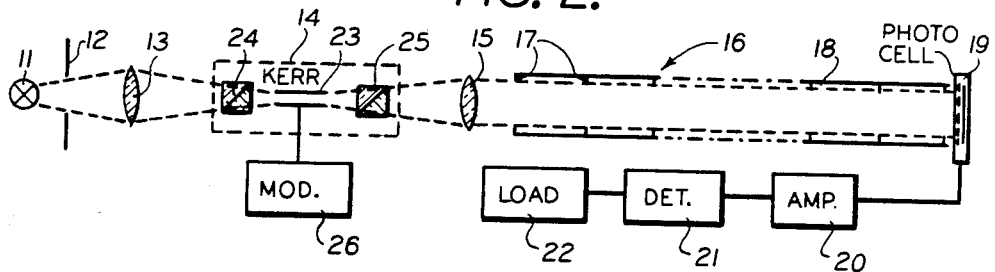

These and other objects of the invention will be more fully apparent from FIG. 1 illustrating the principle of the invention. FIG. 2 shows the invention as applied to an ordinary light source.

Figure 3:
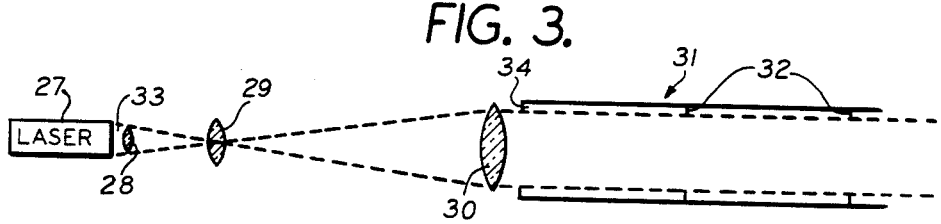
Figure 4:
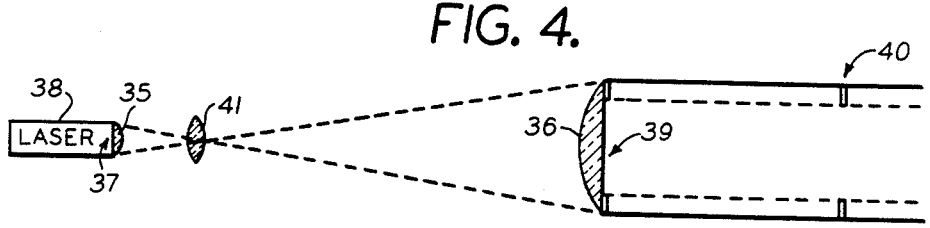

FIG. 3 illustrates the invention as applied to a coherent light source and FIG. 4 a modification of FIG. 3.

The iteration of the wave beam in a beam waveguide by means of phase correcting plates which intercept the beam, as described in the above-mentioned copending patent application, becomes increasingly difficult and inefficient if the guide is designed for the transmission of submillimeter waves, infrared or optical waves. Any known dielectric (natural or artificial) has at these extremely high frequencies considerable dielectric loss so that the dissipation loss in the phase plates exceeds by far the diffraction loss in the guide.

This is primarily caused by the necessity to design the thickness of the phasing devices especially phase plates much greater than it would be necessary from the electrical point of view, because it is mechanically impractical to manufacture and support phase plates if their thickness is 1/10 of a millimeter or even less at the shorter wave lengths.

The dissipation loss could be reduced by increasing the diameter of the beam and thus reducing the number of phase plates per unit length. However, since the guidance of the beam is brought about by the phasing devices and there is no guiding in between, alignment difficulties would arise. For instance, if an infrared light beam of a wave length of $\lambda = 10^{-4}$ cm. and a radius $R = 0.5$ cm. were transmitted by the lowest beam mode of a beam waveguide of optimum phase correction (for minimum diameter at given spacing and a minimum number of phase transformers per unit length) the spacing D between the phase transformers would be approximately $$D \approx \frac{R^2}{\lambda} = 0.25 \times 10^4 \text{ cm.} = 25 \text{ m.}$$

Since the beam, after having passed through one phase plate, propagates like a free wave until it reaches the next phase plate, the alignment of this phase plate with respect to the beam axis must be within a fraction of a millimeter; otherwise excessive loss would be caused by the energy bypassing the phase plate.

In order to avoid this difficulty and to improve the guiding properties, in accordance with one embodiment of the invention, the spacing of the phasing devices, this means the iteration length of the beam, is made much smaller and the iteration is effected by means which do not introduce dissipation losses comparable to those of the phase plates.

If the iteration length of a beam of given diameter is reduced, the required phase correction is correspondingly reduced. Very small phase correction however can be accomplished, in accordance with another embodiment of the invention, simply by cutting off the outermost portion of a wave beam, in other words by passing the beam through an aperture or iris.

The amount of energy removed from the beam in this process needs thereby not to be greater than that which is lost by diffraction in a beam waveguide with dielectric phase plates. Actually, in the latter case, diffraction too contributes to the phase correction; however, this contribution is so small compared to the phase correction by the phase plates that it can be neglected.

Thus, as a specific embodiment of the invention, the beam waveguide for submillimeter and optical waves can be built of an array of irises. These irises cause diffraction and the diffraction in turn takes care of the iteration of beam.

The difference between the beam waveguide with phase plates and that with irises may be seen in the following:

In the beam waveguide with phase plates the phase correction is made with refractive means. Each phase plate resets the phase distribution of the beam *at the location of the phase plate.*

In the iris guide, according to the invention, the iteration is caused by diffraction whereby each iris resets the phase distribution *at the location of the following iris* by eliminating the outer portion of the field of the beam.

Assuming the same iteration length (distance between irises or phase plates respectively) a beam waveguide with iris requires a beam diameter which is almost 10 times as large as that of a beam waveguide with phase plates, if the diffraction losses are the same. The larger diameters are, however, of no disadvantage in the sub-millimeter or optical range. On the contrary, they are even desirable since they allow greater tolerances in the manufacturing process.

The field distribution and the iteration loss in the case of circular apertures are determined by an integral equation similar to equation 2 of the above-mentioned patent application.

$$F(x)q \int_0^a F(\xi) \cdot f(x \cdot \xi) \cdot l^{-j(x^2+\xi^2)} \xi d\xi x = \sqrt{\frac{2\pi}{\lambda D}} \rho; \ a = \sqrt{\frac{2\pi}{\lambda D}} R$$

$F(x)$ denotes the field distribution at each iris.

$\rho$ is the distance of a point from the beam axis.

$f$ is the Bessel function of the order zero if axially symmetrical beams with uniformly directed field are considered, and $q$ is the amplitude ratio of the fields at two successive irises. The equation differs from equation 2 of the original application in that the Kernel has the additional phase factor $$l^{-j(x^2+\xi^2)}$$

The various Eigenfunctions $F$ and Eigenvalues $q$ represent again the field distributions and attenuations of the various iterative beam modes which may be guided by the system. The numerical evaluation of this equation indicates that "$a$" has to be much larger in the iris case than in the case of phase plates to obtain the same attenuation.

As an example we consider a beam waveguide with iris of 1 cm. aperture ($R=0.5$ cm.) and an operative wave length ($\lambda=10^{-4}$ cm.). If the iteration length (spacing between irises) is 25 cm. then $$a = \sqrt{\frac{2\pi}{10^{-4} \times 25}} \cdot 0.5 = 79.3$$

The corresponding $|q|^2$ that is the iteration loss is 0.0015 db. The loss per unit length of the guide is thus $$\frac{0.0015}{25} = 0.00006 \text{db/cam.} = 6 \text{db/km.}$$

The same iteration loss is obtained with a beam waveguide with phase plates having the same spacing of 25 cm. for an "$a$" value of 2.62, this means the radius of the beam is only 0.053 cm. Such a small radius would be very impractical from the technological point of view. Besides, the dissipation losses in the phase plates would be at least 10 times as high using the best available materials.

It is obvious that the iris guide can be operated like the guide employing phase plates with beams at other than circular cross-section and with various field configurations.

Deflections also can be made in substantially the same manner.

Also the terminations are similar.

The irises should preferably be made of absorbing material to avoid undesirable reflection, for instance of metal coated with absorbing material, or of lossy dielectric material. A certain transparency of the irises is not harmful if the field penetrating the iris material is phasewise randomly varying from iris to iris.

The iris may be mounted into a tube. If a metal tube is used, the walls of the tube should preferably be made non-reflective like the irises, although in general such reflections do not affect the transmission adversely.

Irises with several apertures may be used (whereby the corresponding holes are in line) to provide for the simultaneous transmission of several wave beams.

FIG. 1 illustrates the principle of the invention.

In FIG. 1 a beam of free waves derived, for example, from a horn 1 to which there is attached a dielectric lens 2 produces at the outset a substantially parallel or slightly conical wave beam 3. Wave beam 3 at cross-section 4 has a predetermined phase and amplitude distribution, and it is directed after a predetermined distance to an aperture or iris 5 of predetermined cross-section, which may be circular or non-circular such as rectangular corresponding to the cross-sectional shape of beam 3. Iris 5 has such a diameter that after another appropriate distance, say at point 6, as a result of diffraction occurring along the path of the wave beam after passage of aperture 5, the phase distribution existing at cross-section 4 is reestablished at point 6.

At this point 6 another iris 7 of substantially the same configuration as iris 5 is inserted in the path of the wave beam and the phase distribution existing at point 4 or at iris 5 is again reestablished. After a predetermined distance, which in this case is substantially equal to the preceding distance, another aperture or iris 8 is inserted, and in this way an iterative wave beam 10 is produced with rather simple means and of extremely low loss. Apertures or irises 5, 7 and 8, etc. may be mounted in a tubing schematically indicated at 9 consisting of wave absorbing material or having a wave absorbing coating.

FIG. 2 shows the invention applied to free electromagnetic waves of the optical range.

In FIG. 2 a source of a substantially free electromagnetic wave beam of the millimeter or submillimeter range, for example an ordinary point-shaped high intensity light source 11, is applied over an iris 12 and an optical lens 13 to light modulating device 14 and over another optical lens 15 to the beam wave guide proper 16. Beam waveguide 16 consists of a cascade of apertures or irises 17 mounted in a tube 18 which may consist of light absorbent material or which may have an inner coating consisting of such material. The output of beam waveguide 16 is applied over a photoelectric cell 19, an amplifier 20, a detector or demodulator 21 to a load device 22, such as telephone or TV circuitry or any other data reproducing equipment.

Light modulating device 14 may consist of any known apparatus, for example of a Kerr cell 23, provided with a preceding polarizer crystal set 24 and a succeeding analyzer crystal set 25, in otherwise well known manner, and its electrodes are controlled, as also well known from the art, by a source of audio or video modulation 26 or any other data producing equipment.

Irises 17 have a radius $R$ and a spacing $D$ at a wave length $\lambda$ determined by the equation $$a = \sqrt{\frac{2\pi}{\lambda D}} R$$

where $a$ is a constant, preferably of the order of 100 or less.

Light source 11 is an incoherent light source and the arrangement of FIG. 2 operates as follows: Light 11, after passing through iris 12 and Kerr cell modulator 14, is modulated and then after having passed the wave guide 16 is detected by photoelectric cell 19. The current delivered by the photoelectric cell 19 is proportional to the voltage applied to Kerr cell 23.

The aperture of the iris 12 in front of light source 11 is such that the light reaching the beam waveguide 16 is sufficiently coherent, i.e., only the coherent portion of the light is passed through guide 16. Thus only a very small portion of an incoherent light source such as indicated at 11 can be utilized for transmission in accordance with the invention.

FIG. 3 illustrates the invention with a coherent source of free electromagnetic waves and more specifically with a coherent light source such as derived for example from an optical maser or a laser schematically indicated at 27 and which is modulated in otherwise well known manner.

The coherent light beam derived from laser 27 is applied over lens systems 28, 29 and 30 to a beam waveguide 31 including the irises 32 of a diameter and spacing provided in accordance with the invention.

In accordance with the law of optics, lens 28 should be arrayed close to the face 33 of laser 27 and lens 30 should be arranged close to the entrance iris opening 34 of beam waveguide 31.

The coherent light source 27 has a substantially planary face front at 33. The combination of lenses 28, 29 and 30 is adjusted to yield a phase correct enlarged image of plane 33 at the aperture 34 of beam waveguide 31. Lens 28 has a focal length equal to $a$, the distance between lenses 28 and 29. Similarly, lens 30 has a focal length equal to distance $b$ between lenses 29 and 30. The focal length $f$ of lens 29 therefore is determined by the well known relation $$\frac{1}{a}+\frac{1}{b}=\frac{1}{f}$$

In the modification of FIG. 4 lenses 35 and 36 are shown to be attached directly to the face 37 of laser 38 and lens 36 is attached directly over the opening 39 of beam waveguide 40 while the intermediate lens 41 is arranged in between at a distance given by the equation stated above.

It is apparent that in this way it is possible to transmit the light beam derived from a coherent light source onto a beam waveguide having a cross-section of different and any desired dimensions without departing from the scope of this invention.

As a result of measurements underlying the invention it should be noted that with an iris spacing of about 12.5 inches, a loss was measured of about 13 db per kilometer at a wave length of 8.4 millimeter and a beam diameter of 20 inches.

With twice the frequency and twice the iris spacing, the loss will be reduced to half, and at twice the frequency but with the same spacing the loss would amount to approximately 5 db per kilometer.

These experimental results have been found to be in good agreement with the theory.

I claim:
1. In a high frequency transmission system, means for producing a free wave beam of substantially planar electromagnetic wave front progressing into a predetermined direction, said wave beam being coherent at a predetermined point along its path and having at said predetermined point along its path a predetermined cross-section amplitude and phase distribution, and diffracting means arranged across said path at a succeeding point thereof and operative on the circumference of said wave beam to reset the phases of said wave front at a further succeeding point of substantially said predetermined amplitude distribution substantially to the phase distribution prevailing at said predetermined point thereby reiterating said wave beam.

2. System according to claim 1 wherein said diffracting means has an aperture of a radius dependent upon the product of wave length and distance between said points.

3. System according to claim 1 wherein said aperture radius depends upon the square root of the product of said wave length and said distance.

4. System according to claim 1 wherein said diffracting means consist of an iris having a substantially wave absorbing surface.

5. System according to claim 1 wherein said diffracting means consist of several elements arranged in succession spaced in a tube of substantially larger diameter, the inner wall of said tubing being provided with a wave absorbing surface.

6. System according to claim 1 wherein the ratio of the square of said aperture radius over the product of said wave length and distance for submillimeter and optical waves is of the order of 10 and more.

7. System according to claim 1 wherein said beam producing means consist of a point shaped light source and optical means combined with diffracting means to produce a wave beam of predetermined aperture.

8. System according to claim 7 wherein said light source is a coherent light source having said predetermined aperture and arranged close to and cooperating directly with said diffracting means.

9. System according to claim 7 wherein said light source is a coherent light source of an aperture different from said predetermined aperture and optical means to amplitude and phase image the light source aperture upon the aperture of said diffracting means.

10. In a high frequency transmission system, means for producing a free wave beam of substantially planar electromagnetic wave front progressing into a predetermined direction, said wave beam being coherent at a predetermined point along its path, and having at said predetermined point along its path a predetermined cross section amplitude and phase distribution, and diffracting means arranged across said path at a succeeding point thereof and operative on the circumference of said wave beam to reset the phases of said wave front at a further succeeding point of substantially said predetermined amplitude distribution thereby reiterating said wave beam, the diffracting means being combined with refracting means to reduce the diameter of the aperture of both said means, the diffracting means being operative to reset said wave beam at said further succeeding point and the refracting means being operative to reset said wave beam at said succeeding point.

11. System according to claim 10 wherein the ratio of the square of the aperture radius over the product of wavelength and distance is of the order of less than 10.

References Cited by the Examiner

UNITED STATES PATENTS

| | | | |
|---|---|---|---|
| 451,134 | 4/91 | Riddle | 88—1 |
| 1,792,046 | 2/31 | Skaupy. | |
| 2,461,005 | 2/49 | Southworth | 333—95 X |
| 2,588,610 | 3/52 | Boothroyd et al. | 343—753 |
| 2,949,993 | 6/60 | Zublin et al. | 333—31 |

OTHER REFERENCES

Snitzer: "Optical wave-guide modes in small glass fibers," "I" and "II," Journal of the Optical Society of America, vol. 49, No. 11, November 1959, page 1128.

JEWELL H. PEDERSEN, *Primary Examiner.*

EMIL G. ANDERSON, *Examiner.*